US007471933B2

(12) United States Patent
Lin

(10) Patent No.: US 7,471,933 B2
(45) Date of Patent: Dec. 30, 2008

(54) HOST WITH AN ADJUSTABLE ANTENNA

(75) Inventor: Wen-Hao Lin, Sindian (TW)

(73) Assignee: Giga-Byte Technology Co., Ltd., Taipei County (TW)

( * ) Notice: Subject to any disclaimer, the term of this patent is extended or adjusted under 35 U.S.C. 154(b) by 575 days.

(21) Appl. No.: 11/289,589

(22) Filed: Nov. 30, 2005

(65) Prior Publication Data

US 2007/0123180 A1 May 31, 2007

(51) Int. Cl.
*H04B 1/034* (2006.01)

(52) U.S. Cl. ................... 455/97; 455/562.1; 455/575.1; 455/575.7; 455/575.6; 343/702; 343/906; 343/900

(58) Field of Classification Search ................... 455/97, 455/562.1, 575.1, 575.7, 575.6; 343/702, 343/906, 900
See application file for complete search history.

(56) References Cited

U.S. PATENT DOCUMENTS

| | | | | |
|---|---|---|---|---|
| 6,359,591 | B1 * | 3/2002 | Mou | 343/702 |
| 7,277,738 | B2 * | 10/2007 | Reece et al. | 455/575.7 |
| 2003/0076266 | A1 * | 4/2003 | Schaffer | 343/702 |
| 2004/0090383 | A1 * | 5/2004 | Wang et al. | 343/702 |

* cited by examiner

*Primary Examiner*—Sanh D Phu
(74) *Attorney, Agent, or Firm*—Rosenberg, Klein & Lee

(57) ABSTRACT

A computer host including a casing, an antenna and an antenna holder is provided. More specifically, the antenna holder has an opening perpendicular to one side of the host and is located in the back side of the host and close to the intersection of a top, a side and the back side of the host so that an antenna fixed into the antenna holder can rotate and swing on a higher place relative to the casing of the host. This means that the antenna can be adjusted to any direction to receive the best signals while the host is either straightened up or lay down.

3 Claims, 6 Drawing Sheets

HOST WITH AN ADJUSTABLE ANTENNA

TECHNICAL FIELD

The present invention refers to a computer host with an omnidirectional antenna, more particularly, to a computer host provided for a typical wireless network connection via omnidirectional antenna.

BACKGROUND OF THE INVENTION

For a typical wireless network connection, an antenna apparatus is connected to a computer host and is oriented toward the direction of wireless access point such as shown in the TW Pat. Nos. 385,922; 582,629; 385,922; and 582,629.

As shown in the U.S. patent application Publication No. US2004/0227684A1, it discloses a directional antenna apparatus, which includes an adjustable antenna and a wireless network card; and connects to a computer host via a USB cable exposed to outside of the computer host.

As shown in the U.S. patent application Publication Nos. US2004/0192075A1 and US2004/0150571A1, the inventions respectively disclose a computer host integrated with a panel antenna. However, the panel antenna is unadjustable to a direction and a tilted angle thereof arbitrarily toward a wireless access point as precise as possible so as to promote an efficiency of receiving and transmitting RF signals.

Further information can be found in the U.S. patent application Publication No. US2004/0192075A1, which further provides with a wireless network card connected with a computer host via a connector; and two panel antennas wherein one of the two panel antennas is located on the front of the casing of the computer host and the other is located at the top of the casing. The connector hidden in the inner of the casing connects the two panel antennas with the computer host. However, once the computer host is placed in a position under a table, the panel antenna which is on the top of the computer host will provide weak signal transmission and reception.

Still other computer host disclosed in the TW Pub No.: 200413884 provides a directional antenna whose tilted angle can be adjusted to a certain degree. However, the notebook computer can not be put as straightened up or lay down and neither be placed under a table as above described conventional inventions.

SUMMARY OF INVENTION

The primary objective of the present invention is to provide a computer host with an adjustable antenna. Even though the computer host is not integrated with a keyboard or a monitor, it can be placed on any occasion as straightening up or lying down under a table so as to provide improved transmission and reception instead of the problems caused by the inappropriate antenna integration, exposed transmission lines, and the inflexible antenna as mentioned above.

Specifically, the computer host of the present invention includes a casing, a main board fixed in the casing, a connector mounted on the computer host, a wireless network card inserted into the connector, an adjustable antenna fixed on the casing of the computer host and an electrical connection line connected the adjustable antenna with the wireless network card. Wherein, the adjustable antenna includes a fixing part, a turning section and an electric wave coupling section. The fixing part is provided for coupling with an opening of the antenna holder; and the turning section has two terminals wherein one of the two terminals is provided for rotatively connecting with the fixing part and the other terminal is provided for swingably connecting with the electric wave coupling section.

More particularly, the casing has the antenna holder and a hole. The antenna holder is formed at a back of the casing and is close to an intersection of a top, a side and the back of the casing. Moreover, the antenna holder has the opening whose normal line paralleled with a normal line of the top of the casing. On the other hand, the hole of the casing is formed at the back of the casing next to the antenna holder for penetrating through by the electrical connection line so that the electrical connection line will not be exposed outside.

More importantly, since the antenna holder is formed at the back of the casing of the computer host and close to the intersection of the top, the side and the back side of the casing; and the terminal of the turning section of the adjustable antenna connected with the electric wave coupling section is placed in a higher position relative to the top side of the casing. Accordingly, the electric wave coupling section enables to rotate or swing in the higher position relative to the top side of the casing, and further enables to swing to the position parallel to the top of the casing. Therefore, no matter the computer host is straightened up or lay down or even placed under a table, the adjustable antenna is adjustable to optimize the direction and the tilted angle suitable for any circumstance.

BRIEF DESCRIPTION OF DRAWINGS

The invention will be more clearly understood after referring to the following detailed description read in conjunction with the drawings wherein.

DETAILED DESCRIPTION OF PREFERRED EMBODIMENTS

Figure 1:
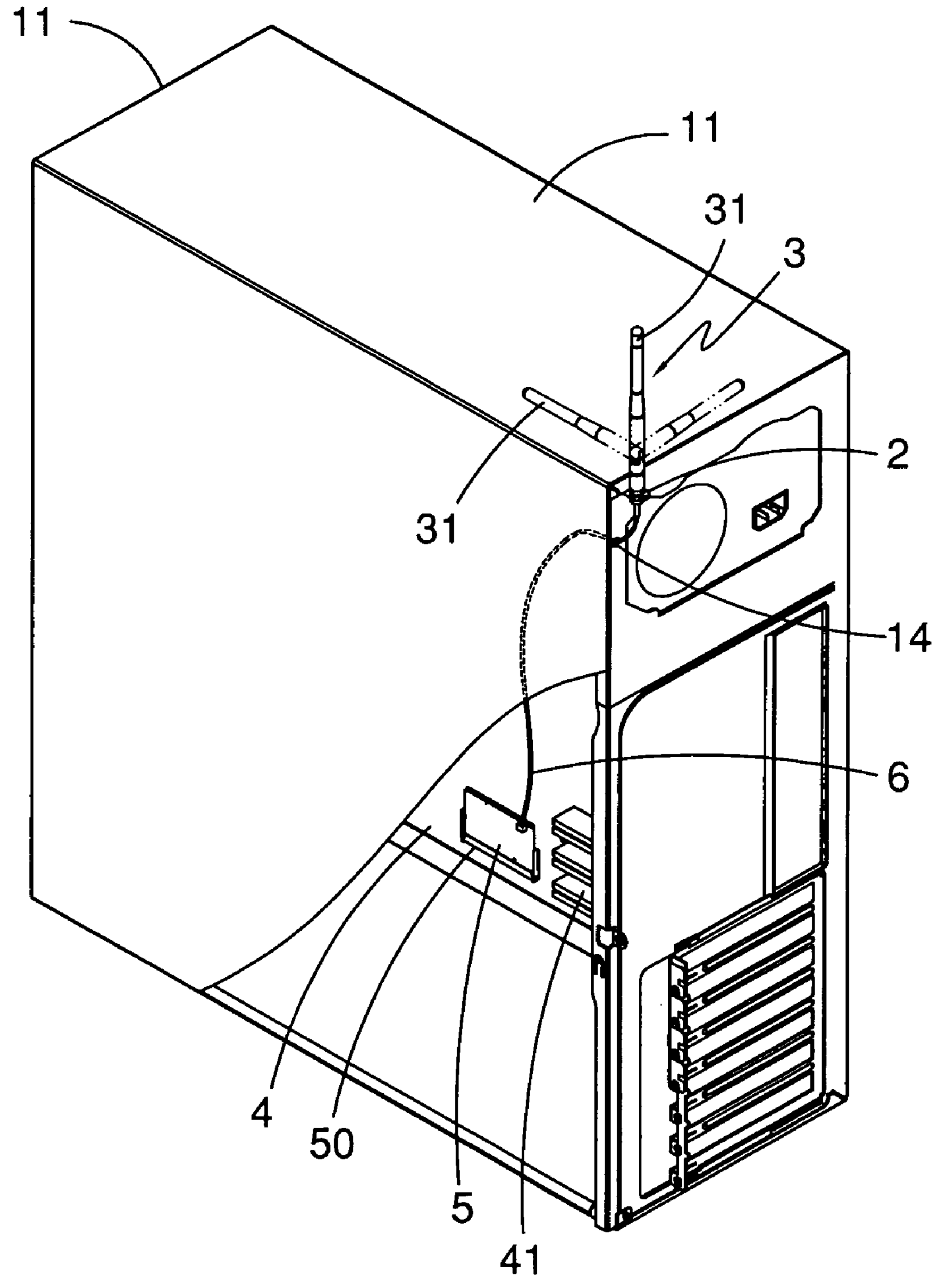
FIG. 1 is a perspective view of a preferred embodiment of the present invention, showing the computer host being straightened up.

As shown in FIG. 1, a computer host 1 with an adjustable antenna embodied in the present invention is composed of a casing 11, which has an antenna holder 2 and a hole 14, an adjustable antenna 3 coupled with the antenna holder 2, a main board 4 fabricated and fixed in the casing 11, a connector 50 mounted on the main board 4, a wireless network card 5 inserted into the connector 50, an electrical connection line 6 connected the adjustable antenna 3 with the wireless network card 5. Wherein, the connector 50 is electrically connected to the main board 4, which is connected with the wireless network card 5 via the connector 50 so that the wireless network card 5 won't occupy any PCI slot 41 which is mounted on the main board 4. Besides, the electrical connection line 6 penetrates through the inside of the casing 11 via the hole 14 with only a few part exposed outside of the casing 11 so as to prevent from intertwisting with other cables.

Figure 2:
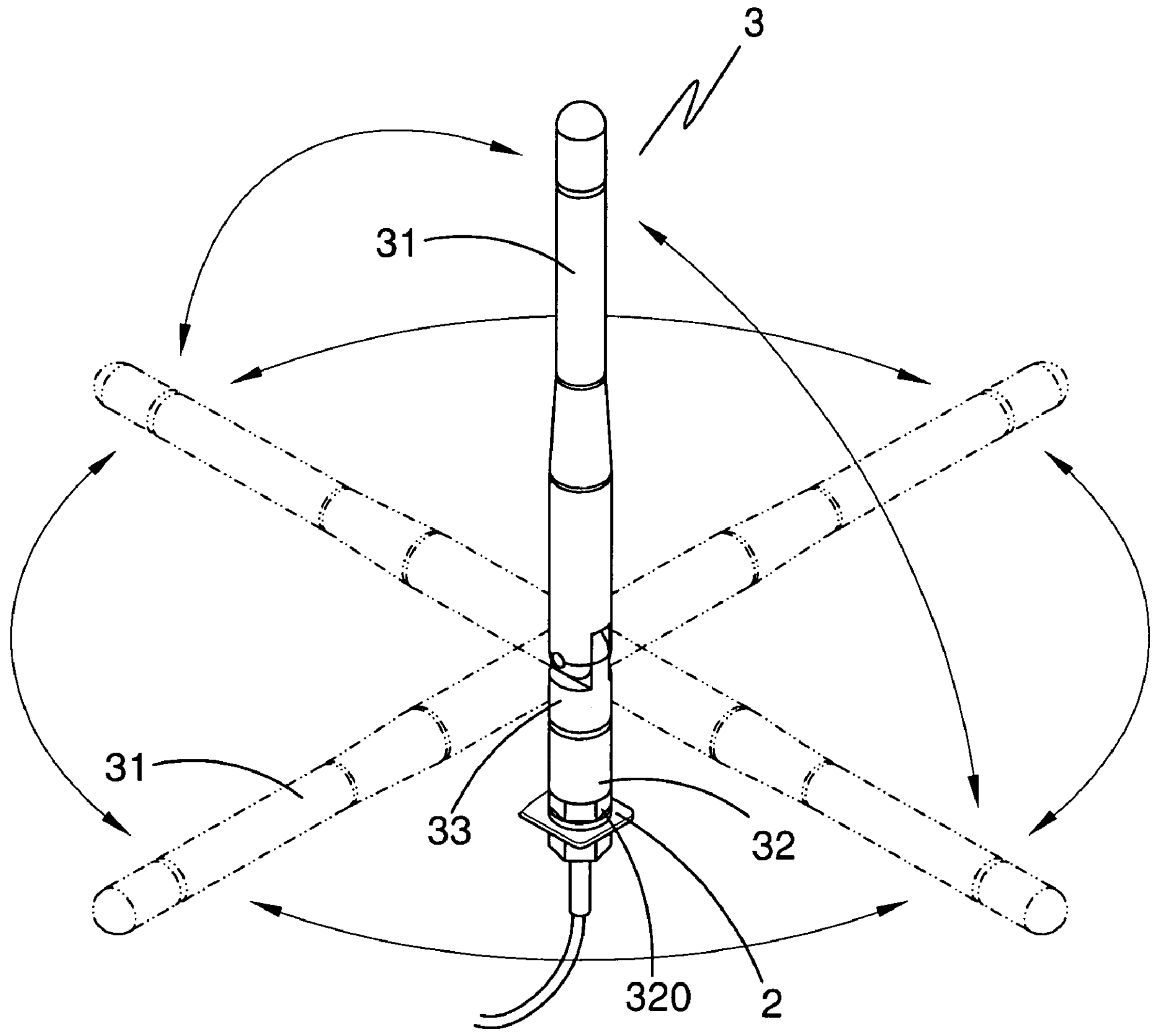
FIG. 2 is a perspective view of an adjustable antenna of the present invention, showing movements of the adjustable antenna.

Referring to FIG. 2, the adjustable antenna 3 pivoted mounted on the antenna holder 2 can rotate or swing to any direction or tilted angle because the adjustable antenna 3 has a fixing part 32 configured on the antenna holder 2, a turning section 33 with two terminals and an electric wave coupling section 31. Wherein one of the two terminals is rotatively connected to the fixing part 32, and the other one is swingably connected with the electric wave coupling section 31.

Figure 3:
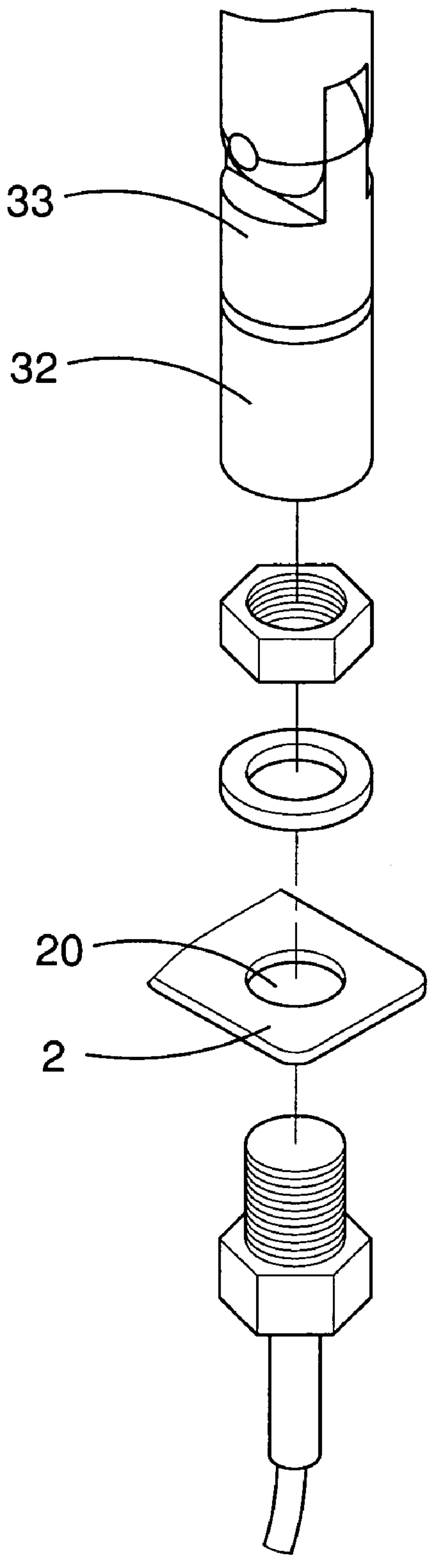
FIG. 3 is an exploded view, showing the assembly of the adjustable antenna and the antenna holder.
Figure 4:
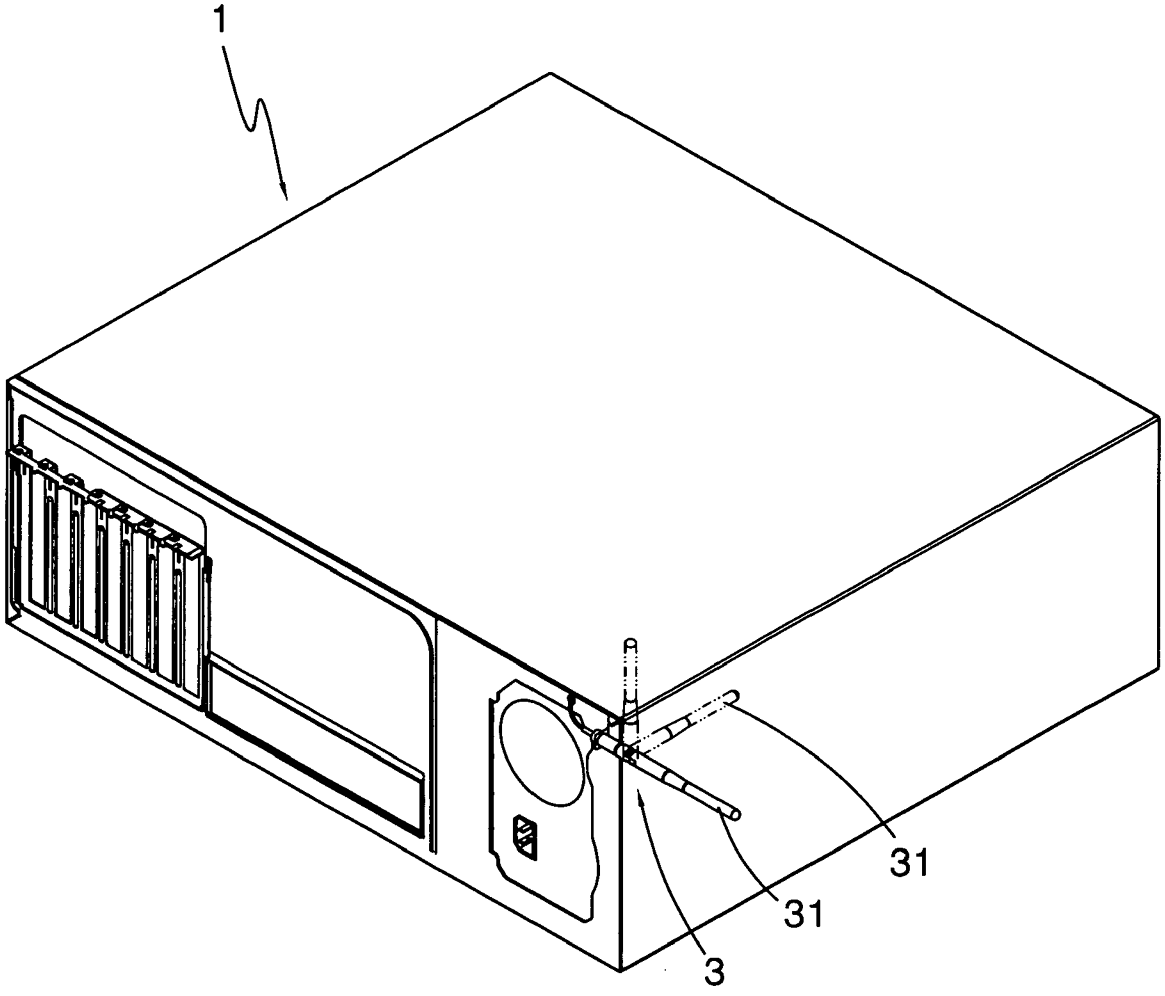
FIG. 4 is a perspective view of the preferred embodiment of the present invention, showing the computer host being lay down.

In FIG. 3, the fixing part 32 is fixed onto the opening 20 of the antenna holder 2 via a screw. Since the antenna holder 2 is disposed to the back of the casing 11 of the computer host 1 and close to the intersection of the top, the side and the back of the casing 1; the normal line of the opening 20 of the antenna holder 2 is parallel to the top of the casing 11; and the turning section 33 of the adjustable antenna 3 is connected with the electric wave coupling section 31 in a higher place relative to the topside of the casing. Therefore, the electric wave coupling section 31 can rotate or swing on the higher position relative to the top of the casing 11 or even swing to the position parallel to the top of the casing 11. Therefore, no matter the computer host 1 is straightened up or lay down or even placed under a table, the electric wave coupling section 31 of the adjustable antenna 3 is adjustable to optimize the direction and the tilted angle suitable for any circumstances.

Figure 5:
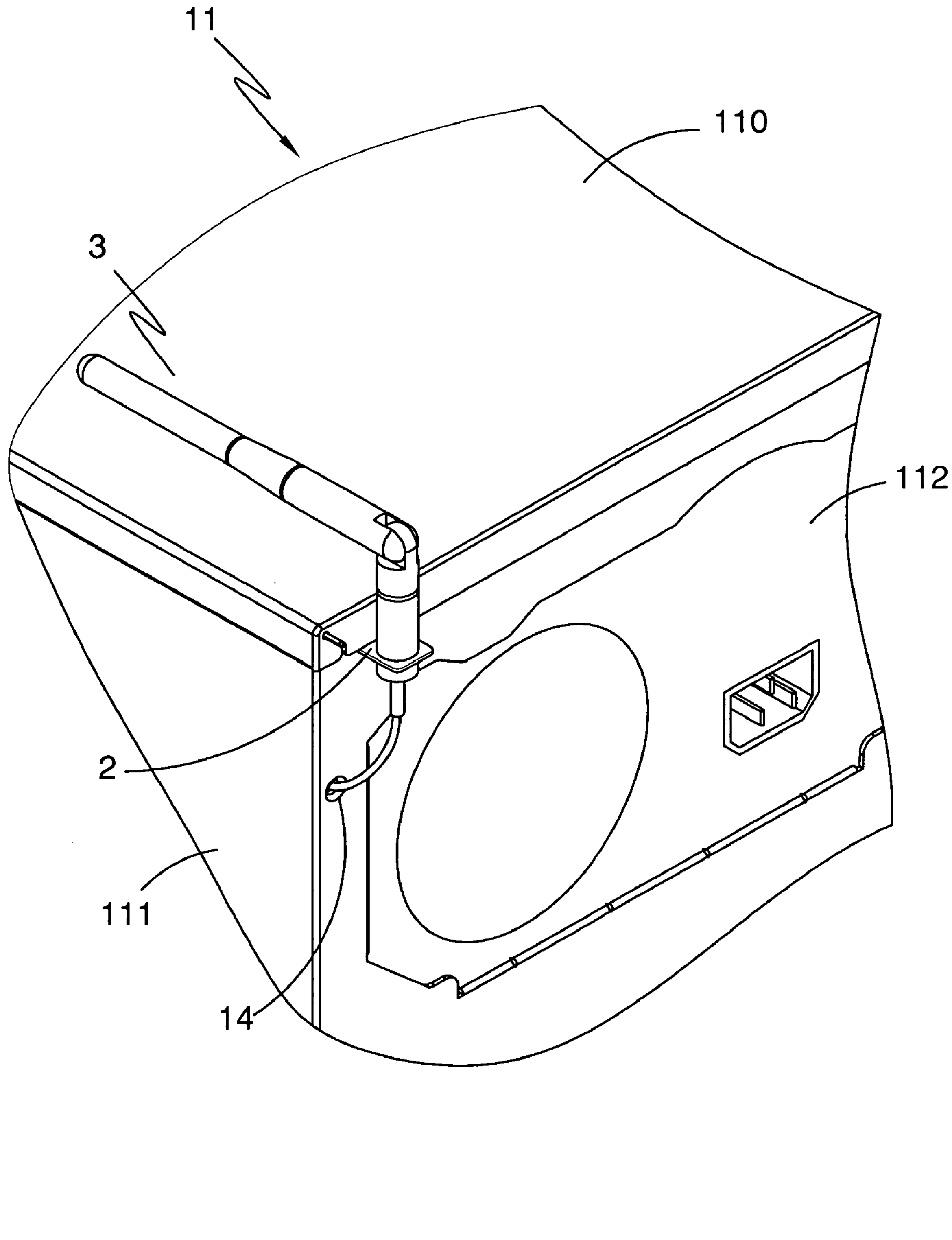
FIG. 5 is a perspective view of another embodiment of the present invention, showing the antenna holder extending from a top side of a casing.

Referring to FIG. 5, the casing 11 according to another embodiment of the present invention is composed of a top plate 110, a side plate 111 and a back plate 112 as a top, a side and a backside of the computer host respectively. The top plate 110 has a long side connected to the side plate 111 and a short side connected to the back plate 112. For easy fabrications, the antenna holder 2 can be manufactured and merged together with the top plate 110 simultaneously and configured as the extension of the short side of the top plate 110, also perpendicular to the back plate 112, and close to the side plate 111 so as to make a normal line of the opening of the antenna holder 2 parallel to a normal line of the top plate 110. As for the hole 14 described in the above embodiments, it is formed on the back plate 112 and close to the antenna holder 2.

Even though the antenna holder 2 is made as a part of the top plate 110; however, the antenna holder 2 can be also made as a part of the side plate 111 or the back plate 112 without any trouble.

Figure 6:
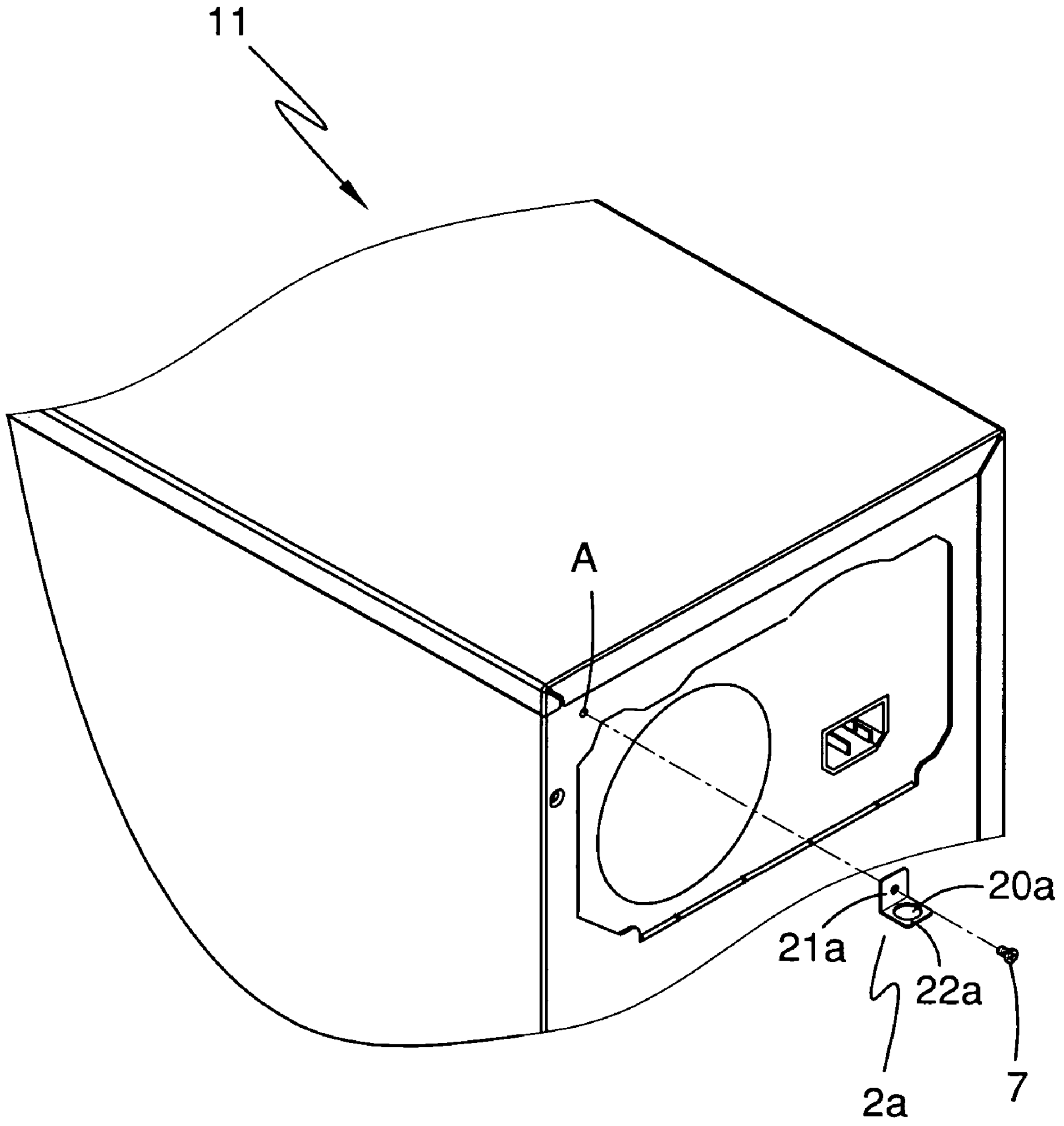
FIG. 6 is a perspective view of a further embodiment of the present invention, showing the antenna holder being rotatively connected to the back of the casing.

FIG. 6 shows another feature of an antenna holder **2*a* as a further embodiment of the present invention. The antenna holder 2*a* includes a connection plate 21*a* and a base 22*a*, which has an opening 20*a* and vertically extends from the connection plate 21*a*. Wherein, the connection plate 21*a* is connected with a back, namely a back plate, of the casing 11 via a screw 7. More specifically, the connection plate 21*a* is connected to a point A of the back plate of the casing 11, and the point A is close to the intersection of a top (top plate), a side (side plate) and a back (back plate) of the casing 11. Thus, the antenna holder 2*a* can rotate and move to a difference position by adjusting the screw 7** so as to enlarge the scope of the adjustable antenna.

Although it is widely known of a computer having wireless network connection with integrated antenna in prior arts. However, it is a first time to see this method according to the present invention provided with an integrated adjustable antenna in a specific position of a casing of the computer, therefore the adjustable antenna may be optimized to the best direction or title angle suitable to circumstance.

The embodiments of the present invention described above are to be deemed in all respects as being merely illustrative and not restrictive. Accordingly, the present invention may be embodied in other specific forms without deviating from the spirit thereof. The present invention is therefore to be limited only by the scopes of the following appended claim.

I claim:

1. A computer host comprising:

a casing, having a top plate, a side plate, a back plate and an antenna holder, wherein the top plate has a long side connected with the side plate and a short side connected with the back plate; and the antenna holder is extended from the short side of the top plate, perpendicular to the back plate and close to the side plate; and the back plate has a hole close to the antenna holder which has an opening whose normal line parallel to the normal line of the top plate;

a main board, fixed inside the casing;

a connector, mounted on the main board;

a wireless network card, inserted into the connector and electrically connected to the main board via the connector;

an adjustable antenna, including a fixing part, a turning section with two terminals and an electric wave coupling section, wherein the fixing part is provided for coupling with the opening of the antenna holder; and one of the two terminals of the turning section rotatively connected with the fixing part, and the other terminal swingably connected with the electric wave coupling section in a higher position relative to the top of the casing; and an electrical connection line, penetrating through the hole of the back plate, and having two ends electrically connected with the adjustable antenna and the wireless network card respectively.

2. A computer host comprising:

a casing, having a hole formed on a back thereof and close to an intersection of a top, a side and the back of the casing;

a main board, fixed inside the casing;

a connector, mounted on the main board;

a wireless network card, inserted into the connector and electrically connected to the main board via the connector;

an antenna holder, including a connection plate and a base, wherein the connection plate being rotatively connected with the back of the casing and close to the intersection of the top, the side, and the back of the casing; and the base is vertically extended from the connection plate with a hole thereon;

an adjustable antenna, including a fixing part, a turning section with two terminals and an electric wave coupling section, wherein the fixing part is provided for coupling with the opening of the antenna holder; and one of the two terminals of the turning section rotatively connected with the fixing part, and the other terminal swingably connected with the electric wave coupling section in a higher position relative to the top of the casing; and an electrical connection line, penetrating through the hole of the casing, and having two ends electrically connected with the adjustable antenna and the wireless network card respectively.

3. A computer host comprising:

a casing, having an antenna holder and a hole formed on a back of the casing close to an intersection of a top, a side and the back of the casing; wherein the hole is close to the antenna holder which has an opening whose normal line parallel to the normal line of the top of the casing;

a main board, fixed inside the casing;

a connector, mounted on the main board;

a wireless network card, inserted into the connector and electrically connected to the main board via the connector;

an adjustable antenna, including a fixing part, a turning section with two terminals and an electric wave coupling section, wherein the fixing part is provided for coupling with the opening of the antenna holder; and one of the two terminals of the turning section may rotatively connected with the fixing part, and the other terminal swingably connected with the electric wave coupling section in a higher position relative to the top of the casing; and an electrical connection line, penetrating through the hole of the casing, and having two ends electrically connected with the adjustable antenna and the wireless network card respectively.

* * * * *